US 8,300,668 B2

(12) United States Patent
Kim et al.

(10) Patent No.: US 8,300,668 B2
(45) Date of Patent: Oct. 30, 2012

(54) AUTOMATIC DELAY COMPENSATED SIMULCASTING SYSTEM AND METHOD

(75) Inventors: Junius A. Kim, Cincinnati, OH (US); Keyur R. Parikh, Mason, OH (US)

(73) Assignee: Harris Corporation, Melbourne, FL (US)

( * ) Notice: Subject to any disclaimer, the term of this patent is extended or adjusted under 35 U.S.C. 154(b) by 865 days.

(21) Appl. No.: 11/540,301

(22) Filed: Sep. 29, 2006

(65) Prior Publication Data
US 2008/0187009 A1    Aug. 7, 2008

(51) Int. Cl.
*H04J 3/06* (2006.01)
(52) U.S. Cl. ......... 370/508; 370/350; 370/509; 370/517
(58) Field of Classification Search .................. 370/350, 370/328, 338, 517–519, 503–509; 455/503, 455/12.1, 67.14
See application file for complete search history.

(56) References Cited

U.S. PATENT DOCUMENTS

| | | | |
|---|---|---|---|
| 4,696,052 A | 9/1987 | Breeden | |
| 5,280,629 A | 1/1994 | Lo Galbo et al. | |
| 6,011,977 A | 1/2000 | Brown et al. | |
| 6,813,257 B1 * | 11/2004 | Emmons et al. | 370/335 |
| 6,931,023 B2 * | 8/2005 | Lin et al. | 370/458 |
| 7,085,276 B1 | 8/2006 | Heitmann | |
| 7,379,466 B2 * | 5/2008 | Kavaler | 370/412 |
| 2006/0088023 A1 * | 4/2006 | Muller | 370/350 |
| 2007/0195824 A9 * | 8/2007 | Chapman et al. | 370/490 |

OTHER PUBLICATIONS

U.S. Appl. No. 2006/0088023A1; published Apr. 27, 2006.

* cited by examiner

*Primary Examiner* — Mark Rinehart
*Assistant Examiner* — Christopher R Crompton
(74) *Attorney, Agent, or Firm* — Tarolli, Sundheim, Covell & Tummino LLP

(57) ABSTRACT

A system and method of synchronizing transmissions in a simulcast system by continuously adjusting the signal transmission delay. Timing information that includes a GPS timestamp is continuously generated at a source site, encoded into a timing packet which along with a content signal can be transported over a network link such as T1/E1 or a packet switched network to multiple transmitter sites. Once received at a transmitter site, the timing packet along with the content signal is delayed by an adjustable delay. The GPS timestamp in the received timing packet is compared to a GPS timestamp that is generated at the transmitter site upon arrival of the timing packet. Based on a variance between that comparison and the value of a user-specified target delay, the delay of the received signal is adjusted to synchronize signal transmissions in the simulcast system.

16 Claims, 5 Drawing Sheets

| | Element | Length | Description |
|---|---|---|---|
| 31 | Start of packet | 8 bits | Byte marker of 0xFF to indicate the start of the timing packet |
| 32 | Status | 8 bits | Status byte. Status of the SNC-101S card. Only one bit is used now to report the GPS receiver alarm status. The remaining 7 bits are reserved for future use. |
| 33 | Timing count | 24 bits | 24-bit count in 100 nS units between the GPS receiver 1 second indicator and the start of the timing packet. The start of the timing packet is defined as the rising clock edge of the 1st bit of the start of packet word.<br><br>The timing count has a value between 0 and 10,000,000 |
| 34 | Checksum | 8 bits | 8-bit checksum of the 8-bit status byte and 24-bit timing word |
| 35 | End of packet | 8 bits | Byte marker of 0xFF to indicate the end of the timing packet |
| 36 | Idle | 8 bits | Idle pattern of 0x7E |

FIG. 3

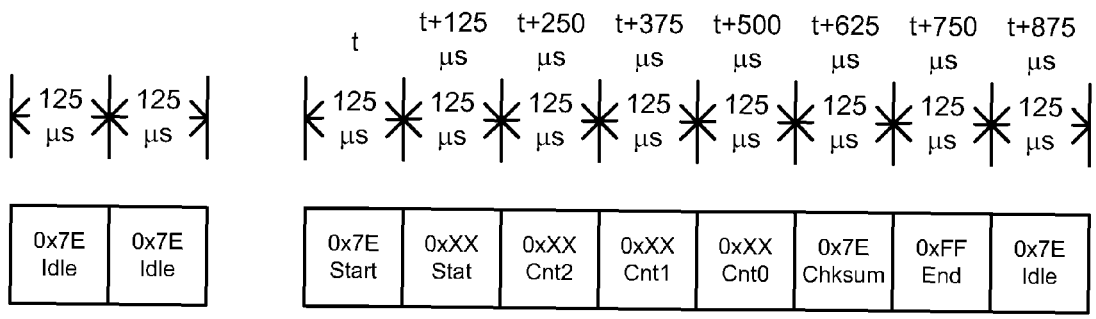

Stat(7...0) is a status byte.
Cnt(23...0) is a 24-bit word.
Cnt(23...0)=Cnt2(MSB)+Cnt1+Cnt0(LSB)
Cnt(23...0) = 0.1 μs ticks from the start of the 1 second mark

FIG. 3A

AUTOMATIC DELAY COMPENSATED SIMULCASTING SYSTEM AND METHOD

FIELD OF THE INVENTION

The present invention relates to simulcast communication systems, and more particularly to a system and method of synchronizing signal transmissions in a simulcast system that utilizes a packet switched network, or a TDM network to link multiple transmitter sites to a studio site.

BACKGROUND

Simulcast systems utilize multiple transmitter sites to transmit a signal of interest, where the multiple transmitter sites operate on the same carrier frequency, to generate overlapping coverage areas. The multiple transmitter sites achieve a greater geographic coverage area than can be achieved by using a single transmitter. Typically, multiple simulcast transmitters transmit the same signal, on the same frequency/channel, and at the same time, so that receivers within the overlapping coverage areas receive the transmitted signal from the multiple transmitters simultaneously, without interference.

Interference typically occurs when multiple transmitted signals arrive at a receiver at slightly different times, out of phase with each other. This is often due to differences in propagation delays, multipath distortion, and other factors. When a receiver receives signals from two or more transmitters at slightly different times, a form of distortion known as Simulcast Delay Spread (SDS) distortion is created. Under certain conditions this distortion may become severe, and corrupt the received signal to an unacceptable degree.

The interference can be eliminated by compensating for the propagation delays in the simulcast system, for example, by controlling the relative timing of the respective signal transmissions, so that the propagation delays are offset and thereby eliminated. For example, the interference among the multiple transmitted signals can be minimized by synchronizing the timing of each signal transmission, so that each signal is transmitted at the same time, and at the same frequency, as all the other signals in the simulcast system. Controlling the precise timing is critical, and oftentimes problematic, because even small timing variances can significantly distort the received signal.

Several systems and methods have been introduced in the prior art to provide precise synchronized transmit timing. U.S. Pat. No. 6,011,977 ('977 patent) teaches a method and apparatus relating to simulcasting, in which a timing pulse train and data signal are received at a transmitter site. The pulse timing characteristics of the received timing pulse train are compared with the pulse timing characteristics of a locally generated timing pulse train, to determine an appropriate delay to be used to effect synchronous transmission of the received data signals at their respective transmission sites.

An existing system, the SynchroCast systems®, manufactured by Harris Corporation, includes a studio site and multiple transmitter sites. At the studio site, two reference signals REF1 and REF2 are generated, basically 9600 Hz clocks with three types of embedded flags, referenced from a local Global Positioning System (GPS) satellite receiver. Those reference signals are sampled and encoded for transmission to transmitter sites. The sampled and encoded signals are transmitted to transmitter sites over a TDM network such at T1 or E1.

At the transmitter site, 1 PPS and 10 MHz signals are obtained from a local GPS receiver and are synthesized into delayed 1 PPS and 9600 Hz signals. The signals REF1 and REF2, received from the studio site, are decoded at the transmitter sites to produce the embedded flags, which are compared to the versions of the same produced by the local GPS receiver. From discrepancies, appropriate delays are determined, which are used for nulling out delays between the embedded flags and local time markers. Thus, the existing Harris SynchroCast system transmits time information by embedding time markers into 9600 Hz pulse train signals which are transmitted across a T1/E1 network connection.

A disadvantage of the pulse train approach is that the rate in which time comparisons can be made at the transmitter sites is limited to once per second with most GPS receivers. A custom GPS receiver can be obtained to increase the frequency of its output to greater than 1 PPS, but unfortunately the size of the delay measurement window decreases as well. For example, with a 1 PPS GPS signal, delays can be measured up to a one second maximum.

Accordingly, there is a need for a more responsive system and method to effect synchronous transmission of signals in a simulcast system. Particularly, a system that provides greater precision through more frequent timing measurements, more flexible configurations and a reduction in operating parts, and has a reduced product cost than the systems currently in use.

Another disadvantage of the existing prior art simulcast system is that they do not work over packet switched network links like UDP/IP.

SUMMARY OF THE INVENTION

The present invention provides, in an embodiment, a simulcast system having a source site and a plurality of transmitter sites. A core element in the system is a precision controllable delay element. In order to adapt simulcasting to packet switched networks, this type of delay element suitable for UDP/IP networks is used.

In general, the source site includes a generator that generates a timing packet, which contains a local GPS timestamp, and a source transmitter that transmits the timing packet and a content signal over a TDM or packet switch type network to a RF transmitter site for re-transmission to a user. In T1 or E1 transmission (TDM type networks), the network is point to point; and there is one source system for every one transmitter site system. In a point to multipoint system, there is one source site system and many transmitter site systems. A point to multipoint implementation is only possible in a UDP/IP type network where multi-cast protocol can be used or multiple unicast IP streams can be created at the studio site. Simulcasting using a TDM type network (point to point) requires the studio site to have multiple systems, each linked to one transmit site. The source site further includes a GPS receiver which generates a time reference (typically a 1 PPS and 10 MHz signal) based upon signals received from GPS satellites. A timestamp is produced at the studio site (source site) based upon this GPS time reference. Each transmitter site is coupled to the source site via TDM connection, such as T1 or E1, or a packet switched network such as UDP/IP. The transmitter site includes a receiver for receiving the timing packet and content signal transmitted from the source site, a delay buffer for delaying the received signal by a precision adjustable delay, a comparator for comparing the timestamp in the received timing packet to a timestamp generated at the transmitter site (derived from the output of a GPS receiver at that site), and a computer for controlling the delay of the received content signal based on the comparison of the GPS timestamps, in order to synchronize the content signal transmissions in the simulcast system. The transmitter site further includes a RF transmitter, which is coupled to the delay buffer, and continuously transmits the delayed content signal. In embodiments using a UDP/IP network, the received IP packets at the transmitter site are received into a "jitter buffer." In the jitter buffer, packets received out of sequence are reordered. Since in an IP network, packets are not guaranteed to be sent and then received in the same order. A jitter buffer is used regardless of any simulcast application, and is required in any real-time data over IP application.

In a preferred form of the invention using packet switched networks, TDM data is transported over UDP/IP using RTP (Real Time Protocol), which is a well known protocol. The jitter buffer adds delay. In accordance with the invention, the delay added by the jitter buffer is precisely controlled, for example, using a timestamp comparator, a computer and a precision FLL (Frequency Locked Loop). The FLL times the depletion of the data in the jitter buffer. When the delay in the jitter buffer is static, the depletion datarate is equal to the incoming datarate. When it is required to increase delay, the depletion datarate is reduced from nominal. When it is required to decrease delay, the depletion datarate is increased. The increase/decrease amount is precisely controlled by the computer and FLL. The FLL provides programmable precision frequency offset from nominal. Thus, the invention in one form utilizes a timing packet (as contrasted to a pulse train of the prior art) and a precision controllable delay in a UDP/IP type simulcasting application.

In another embodiment, the present invention provides a method of synchronizing signal transmissions in a simulcast system that utilizes TDM, T1/E1 connections, or a packet switched network, to link a source site to multiple transmitter sites. The method includes generating, at the source site, a timing packet that contains a local GPS timestamp, and transmitting the timing packet along with a content signal to receivers located at each of the transmitter sites for re-transmission to a user. The method further includes delaying the received signals at the respective transmitter sites by an adjustable delay at the transmitter site, and at each transmitter site, comparing the GPS timestamp in the received timing packet to a GPS timestamp generated at the transmitter site. In the next step, a delay of the received content signal is adjusted at each transmitter site based on the comparison of the GPS timestamps, in order to synchronize the content signal transmissions in the simulcast system. The method further includes the step of continuously repeating the above steps, while transmitting the delayed content signal. This method compensates for dynamic changes in network delay conditions over time.

In another embodiment, the present invention provides a simulcast transmitter site having 1) a receiver for receiving a timing packet, which contains a GPS timestamp, and a content signal, for re-transmission to a user, 2) a delay buffer for delaying the received content signal by a precision adjustable delay, 3) a comparator for comparing the GPS timestamp in the received timing packet to a GPS timestamp generated at the transmitter site, and 4) an adjustable delay for adjusting the delay of the received content signal based on the comparison of the GPS timestamps for permitting synchronized signal transmissions in a simulcast system. The transmitter site also includes a transmitter that is coupled to the delay buffer, and continuously transmits the delayed content signal. The transmitter site further includes a GPS receiver for obtaining the GPS timestamp at the transmitter site.

In another embodiment, the present invention provides a method of synchronizing signal transmissions in a simulcast system that utilizes a packet switched network to link multiple transmitter sites. The method includes generating, at a source (or studio) site, a timing packet that contains timing information including a GPS timestamp, and transmitting the timing packet along with a content signal for re-transmission to a user, to a receiver located at each transmitter site. At each transmitter site, the received content signal is delayed by an adjustable delay at the transmitter site, and compared the GPS timestamp in the received timing packet is compared to a GPS timestamp generated at the transmitter site. The method also includes adjusting the delay of the received signal at the respective transmitter sites, based on the comparison of the GPS timestamps, to synchronize the signal transmissions in the simulcast system. The method further includes the step of continuously repeating the above steps, while transmitting the delayed received signal.

BRIEF DESCRIPTION OF THE DRAWINGS

FIG. 3 illustrates key component fields and structure of a timing packet/packet such as may be utilized by an embodiment of the present invention.

FIG. 3A depicts the timing packet transported over a TDM type network on 1 timeslot and being reconstructed at the far-end receiver.

DESCRIPTION OF SPECIFIC EMBODIMENTS

Figure 1:
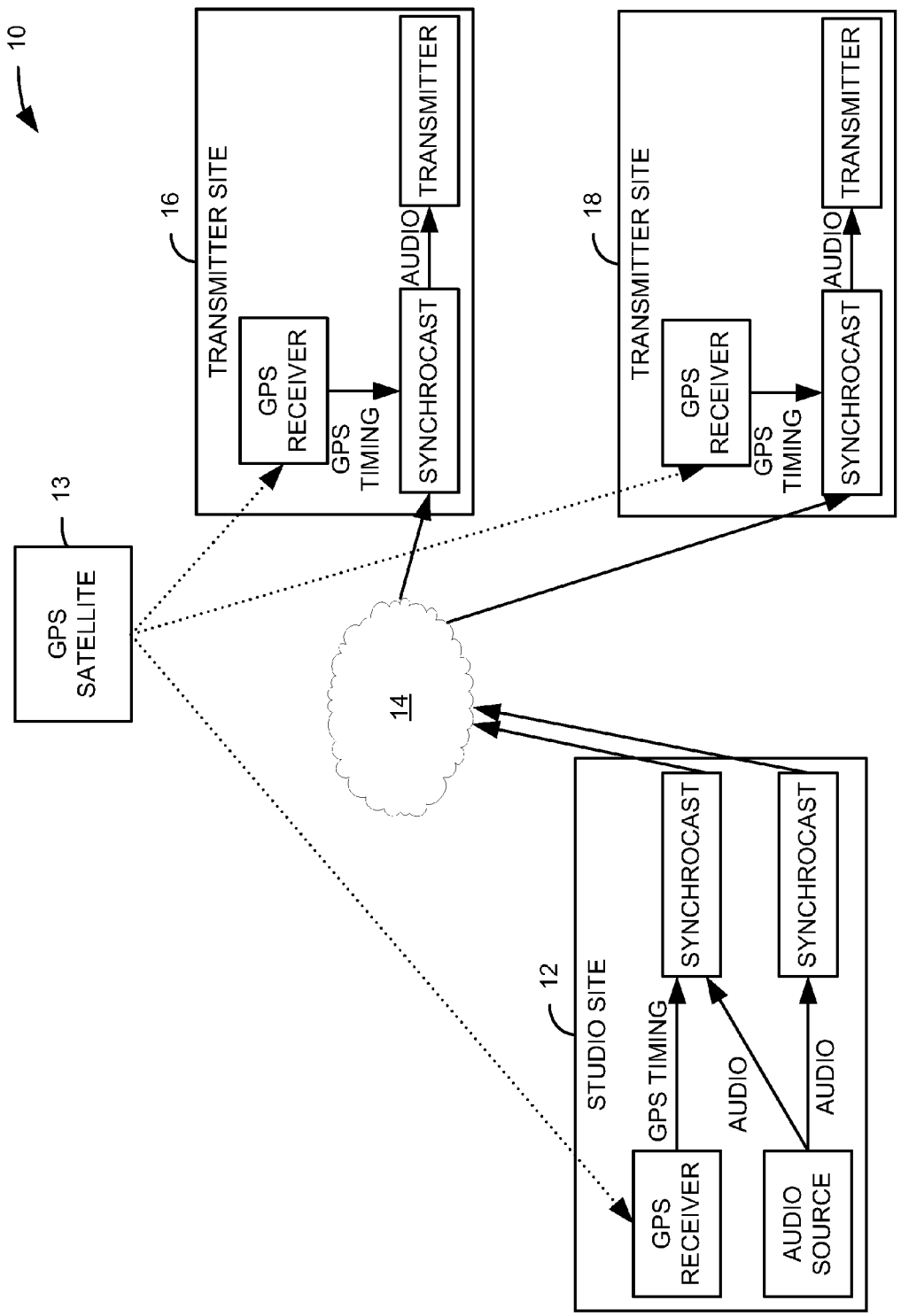
FIG. 1 illustrates a system diagram of a simulcast system that employs a system and method in accordance with principles of the present invention.
Figure 2:
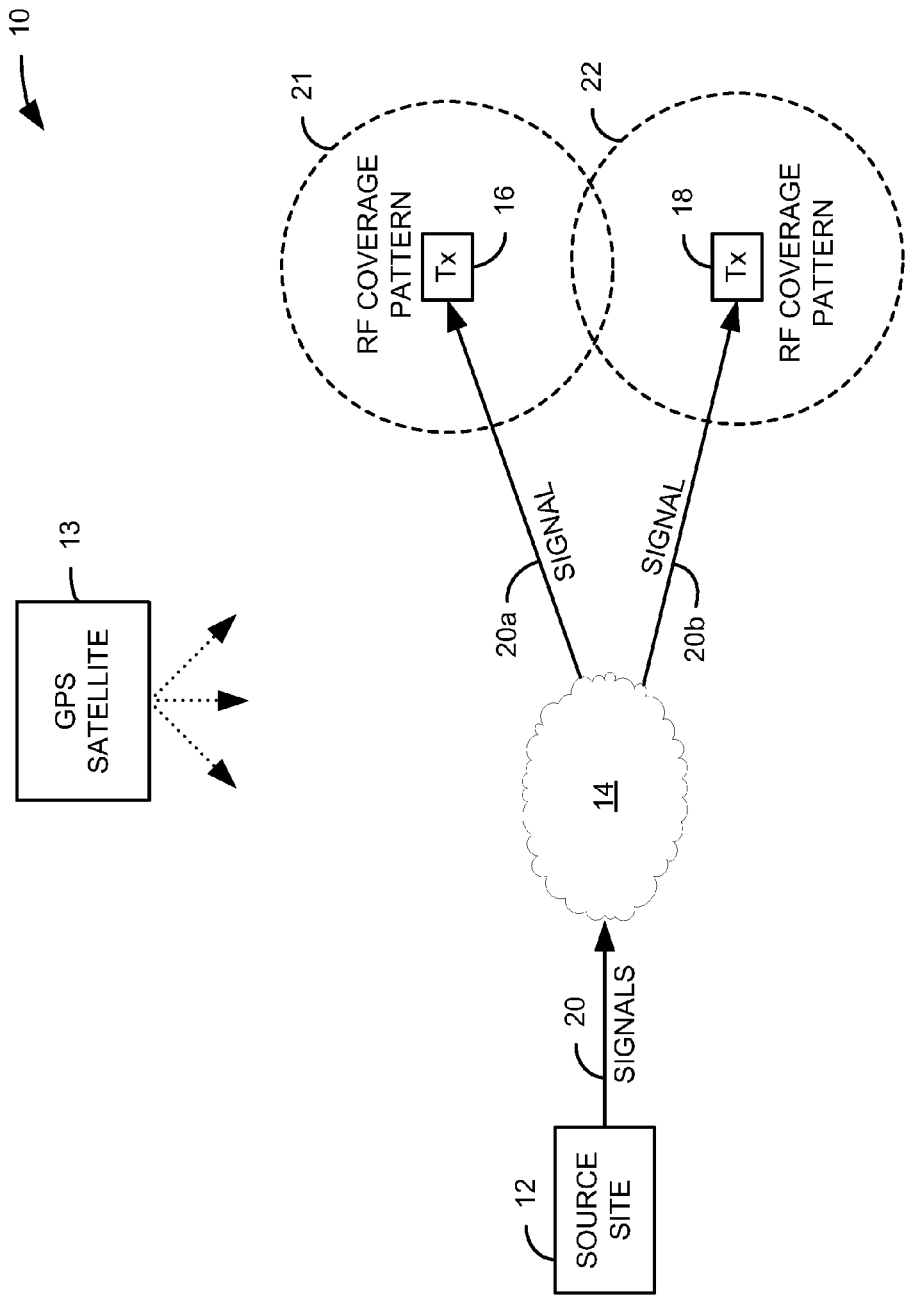
FIG. 2 illustrates a system level view of the handling of timing information at runtime in accordance with an exemplary UDP/IP type point to multipoint embodiment of the invention on a UDP/IP type network.
Figure 4:
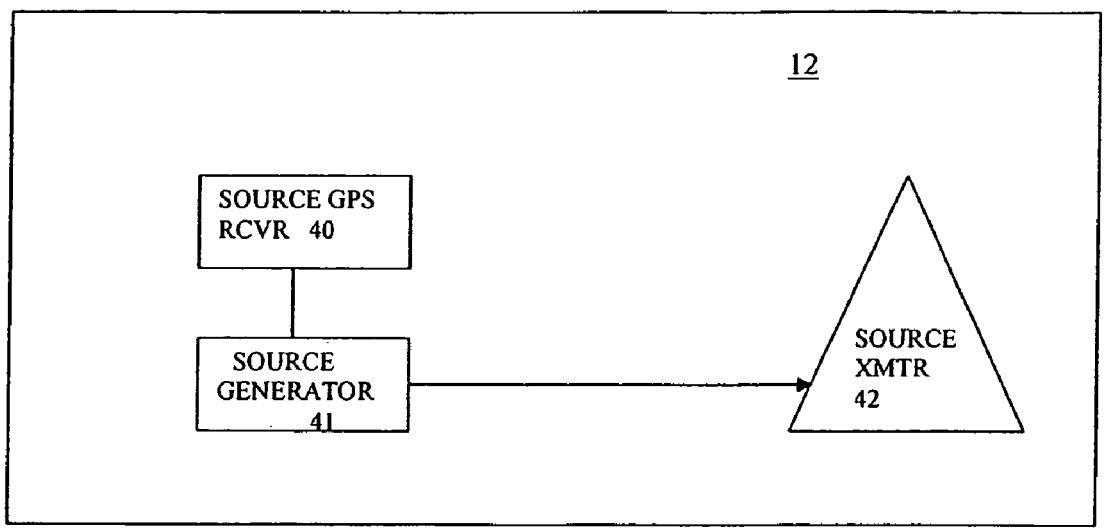
FIG. 4 is a blocked diagram that depicts the main components of a source/studio site such as may be utilized by an embodiment of the present invention.
Figure 5:
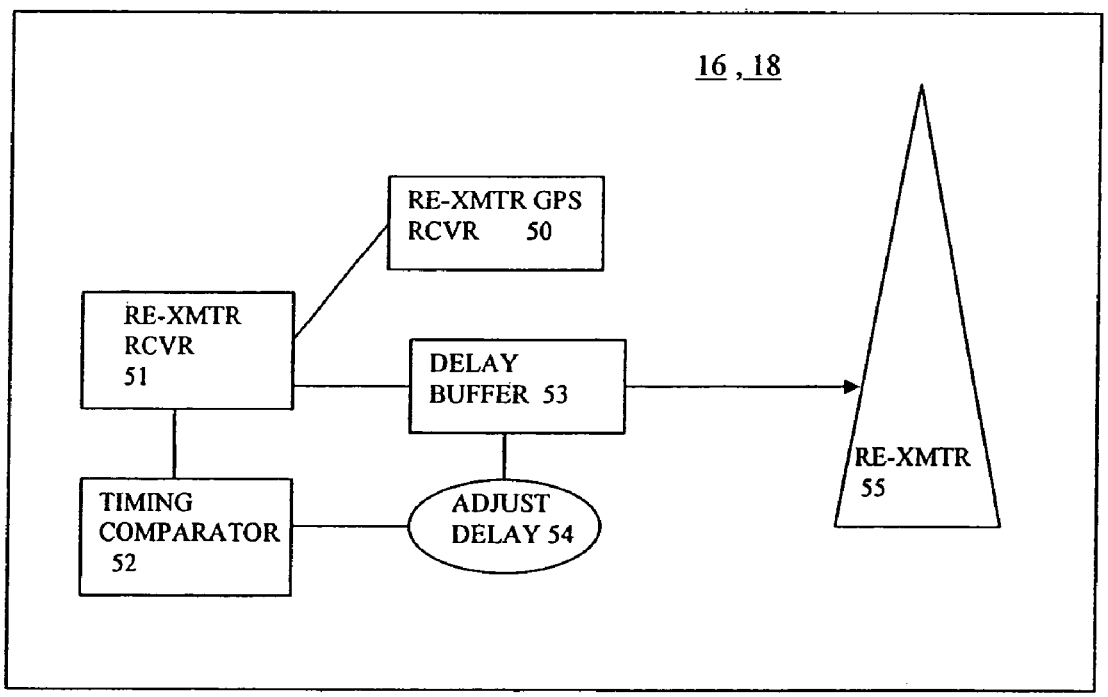
FIG. 5 is a blocked diagram that depicts the main components of a transmitter site such as may be utilized by an embodiment of the present invention.

Generally, and with reference to FIGS. 1 and 2, the present invention provides an improved system and method of synchronizing signal transmissions from geographically dispersed transmitter sites in a simulcast system 10. Synchronization is effected by continuously adjusting signal transmission delays at the various transmitter sites. The simulcast system 10 includes a source (or studio) site 12 coupled by way of a network link 14 to two (or more) transmitter sites 16, 18. The illustrated embodiment is a point to multipoint system on a UDP/IP network. By way of example, the network link 14 may be a TDM T1/E1 network or a packet switched network.

In general, the signals 20 transmitted from source 12 over network link 14 encounter different propagation delays through link 14, so that the signals 20a and 20b applied to transmitter sites 16 and 18, have different delays. Timing information that includes a timestamp derived from a time reference provided by a Global Positioning System (GPS) satellite 13, is continuously generated at source site 12. That timing information is encoded into a timing packet which along with the content signal is transported over either a T1/E1 network or packet switched network. At the transmitter site, the content signal is decoded for RF re-transmission. Re-transmission RF converge patterns 21, 22 from the respective transmitter sites 16, 18 are indicated in FIG. 2 by dashed circles. In the illustrated embodiment, patterns 21 and 22 include an overlap region 17 in which a user would receive re-transmitted signals from both transmitter sites 16 and 18.

At the respective transmitter sites 16, 18, the content signal is delayed by an adjustable delay ΔT so that the re-transmitted signals are synchronized. To effect synchronization, at each transmitter site, the GPS timestamp in the received timing packet is extracted and then compared to a local GPS timestamp referenced to a local GPS receiver from GPS satellite 13. Based on a variance determined by that comparison, a suitable delay ΔT is introduced in the signal path of the content signal, so it is re-transmitted synchronously with re-transmissions occurring at the other transmitter sites of simulcast system 10. Once the signal transmissions are initially synchronized, the system 10 operates dynamically to keep the re-transmissions synchronized accommodating dynamic delay changes over T1/E1 lines or network paths.

In one form of the invention, a timing packet is generated at, and transmitted from, source site 12 to transmitter sites 16, 18, where the received timing packet is compared to a local GPS receiver-based timing signal, and appropriate delays are generated. Preferably, there is an additional buffer delay introduced at each transmitter site.

With reference to FIGS. 2, 3, 3A, 4, and 5, source site 12, includes a generator 41 that is coupled to a source GPS receiver (rcvr) 40, and to a source transmitter (xmtr) 42. The transmitter sites 16, 18 includes a re-transmitter (re-xmtr) receiver 51, a digital delay buffer 53, a timing comparator 52, an adjustable delay 54, a re-transmitter (re-xmtr). These components can be implemented in hardware, software, or a combination of both. In a preferred form of the invention, a computer at the transmitter site (not shown) takes information from the comparator and, from that information, programs or adjusts the delay buffer to effect precision delays.

In operation, the GPS receiver 40 continuously generates a GPS timestamp referenced to transmissions received from GPS satellite 13. The timestamp (derived from the GPS 13) is transferred to generator 41. Generator 41 receives the timestamp, and depending on the type of network link 14, generates timing packets. These timing packets can be transported over a TDM network along with content signal. For example, the timing packet may be encoded onto one timeslot, or a fractional timeslot, and while the content signal is encoded onto other timeslots. In the case of a packet switch network application, the TDM data (containing both the timing packet and the content signal information) are encoded onto UDP/IP packets using RTP (Real Time Protocol). RTP is a method for transporting real time data over packet switched networks. In packet switched embodiments, the timing packet information and content signal are encoded onto the same packets, since they must transverse the network in the same manner as to incur the same delay. The network link 14 can also be a microwave or fiber optic link.

The timing information is discussed below as "timing packet 30," but other convenient models may be used. The timing packet 30, is constructed in a manner similar to High-Level Data Link Control (HDLC). Specifically, in the illustrated embodiment shown in FIG. 3, the timing packet 30, has a fixed length of 7 bytes from the start-of-packet byte 31 to the end-of-packet byte 35. An idle pattern 36 is sent between timing packets 30 as a separator. The timing packet 30 includes status information 32, GPS timestamp information 33, and a checksum 34. The timing packet 30 can be transported over a packet switched network, or a TDM connection, for instance, in a single timeslot or fractional timeslot in a T1/E1 network. FIG. 3A shows the timing packet 30 as transported over one timeslot, and as reconstructed at a far-end receiver 51 of transmitter sites 16, 18.

The source generator 41 also generates and formats the timing packets and content/data signal for transmission to a user. This information is formatted as TDM where timing packets and content/data are interleaved into different timeslots. In the case of packet switched network embodiment, the source transmitter 42 converts this TDM data into RTP/UDP/IP packets. In the case of TDM network embodiment, the source transmitter 42 frames the TDM data into a E1 or T1 compatible signal.

In TDM embodiments, the interleaved timing and content signal frames 20a, 20b are identical to the interleaved timing and content signal frames 20, except that due to different propagation delays on each separate path through network link 14, the arrival time of interleaved frames 20a at transmitter site 16, may differ from the arrival time of frames 20b at transmitter site 18. This difference in arrival time (or delay time) is due to the difference between the distance of the path through network link 14 connecting source site 12 to transmitter site 16, and the distance of the path through network link 14 connecting source site 12 to transmitter site 18. Since one path through network link 14 may be longer than another, it follows that frames 20a, 20b having taken different paths through network link 14, will not arrive at their respective destination transmitter sites 16, 18 simultaneously.

As shown in FIG. 2, transmitter sites 16 and 18 each have their respective transmission coverage areas 21 and 22, which overlap in region 17. If the transmitter sites 16, 18 begin to transmit the same signal and do not synchronize their respective transmission delays, then receivers (e.g., televisions, radios) located within region 17 may receive a distorted signal due to SDS, and interference from the unsynchronized signal transmissions. Therefore, to avoid interference, the signal transmission delay is adjusted so that all transmitter sites 16, 18 transmit the same signal at the same time.

The transmitter sites 16, 18 includes a re-transmitter (re-xmtr) receiver 51, a digital delay buffer 53, a timing comparator 52, an adjustable delay 54, a re-transmitter (re-xmtr) GPS receiver 50, and a re-transmitter (re-xmtr) 55. At each of sites 16 and 18, the re-transmitter (re-xmtr) receiver 51 receives the interleaved timing and content signal frames/packets 20a, 20b, which are transmitted from the source transmitter 42 at source site 12, transfers the content signal packets to delay buffer 53, and transfers the timing packets to comparator 52 for further processing. Also, upon arrival of the packets, receiver 51 requests a local GPS timestamp from GPS receiver 50. The GPS receiver 50 generates the GPS timestamp based on transmissions received from the nearest GPS satellite, such as GPS satellite 13, and sends the GPS timestamp to receiver 51. The receiver 51 then transfers the local GPS timestamp to comparator 52 for further processing.

The delay buffer (e.g., jitter buffer) 53, receives the content signal packets from receiver 51, and delays the transmission of the packets by an adjustable amount of delay, to compensate for the propagation delay (or jitter) associated with the different paths through network link 14. Initially, the amount of delay applied is predetermined, and proportional to the delay inherent in the respective path through network link 14, that the packets utilize to reach their respective destination transmitter site 16, or 18. Thereafter, depending on delay variations between source site 12 and transmitter sites 16, 18, additional amounts of delay are added to synchronize the timing of content signal transmissions.

Comparator 52 receives each timing packet and local GPS timestamp from receiver 51, and compares the GPS timestamp in the received timing packet to the local GPS timestamp. Based on the results of the comparison, as well as the variance between that comparison and the value of a user-specified target delay, the comparator 52 prompts the adjustable delay processor 54 to adjust the transmission delay associated with the content signal packets in delay buffer 53, to correct the timing delay difference between transmitters 16, 18, to synchronize the content signal transmissions in simulcast system 10. Once the signal transmissions are synchronized, transmitter 55, which is coupled to the delay buffer 53, continuously transmits the delayed content signal packets. Due to the continuous processing performed by each component as discussed above, once synchronized, system 10 operates automatically to keep the timing delay constant, even if the content signal is rerouted over an alternate T1/E1 line or IP network path.

In a preferred form of the invention, simulcasting is performed over a UDP/IP Network. An exemplary (receiver portion) of a transmitter site 80 coupled to UDP/IP network is shown on FIG. 6.

The transmitter 80 includes a jitter buffer 53, which receives IP packets (from the studio site) via IP network 14. The received IP packets from buffer 53 are converted to TDM form in IP-to-TDM converter 84, and passed to TDM bus 88. Signals outbound from transmitter 80 are applied from TDM bus 90 to a TDM-to-IP packet converter 94, and then transmitted via IP network 14. A local GPS receive 95 provides the information used to generate a local timestamp as noted above.

Figure 6:
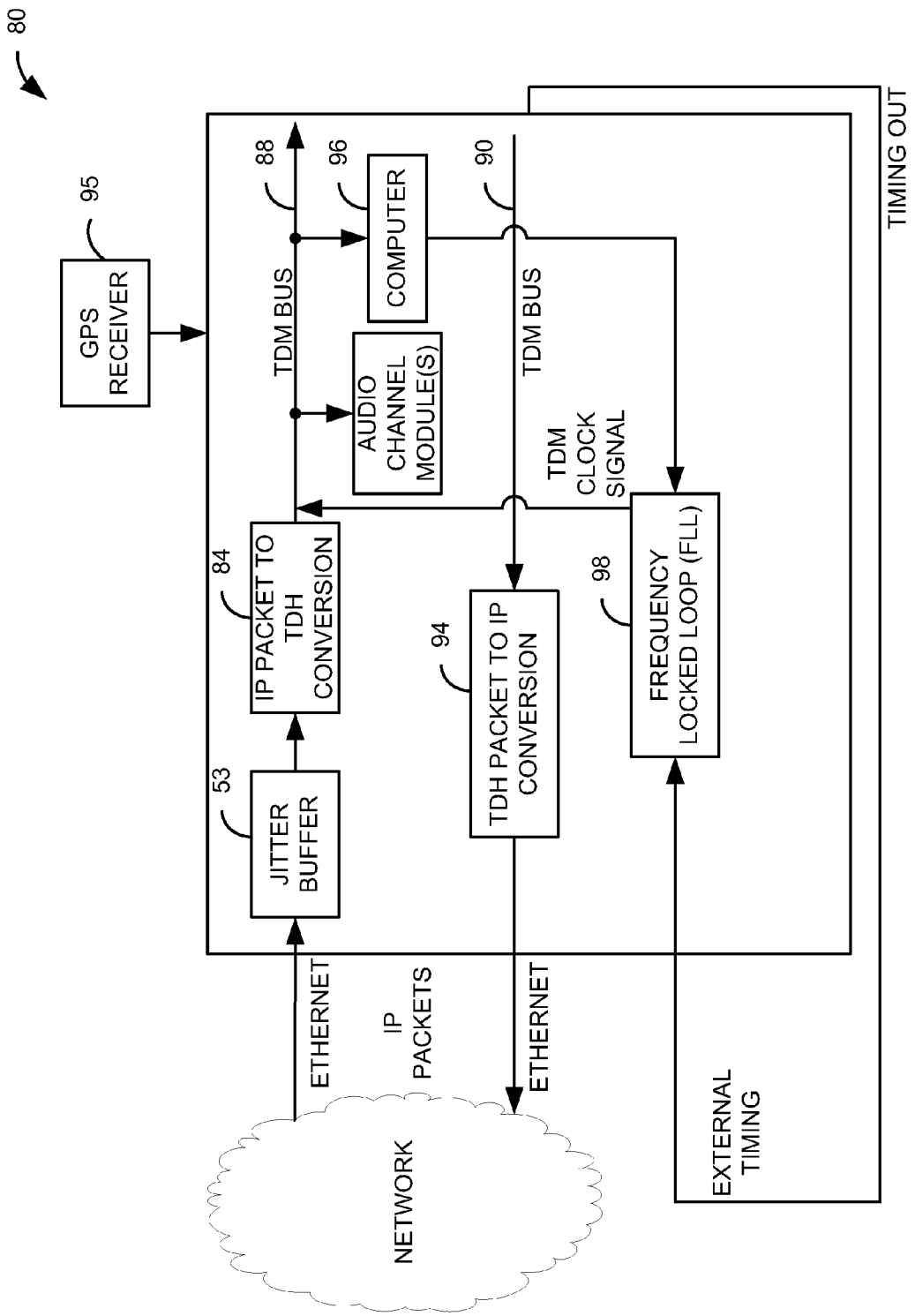
FIG. 6 is a block diagram of an exemplary receive portion of a transmitter site in an IP form of the invention.

In the embodiment at FIG. 6, the TDM data is clocked at a rate determined by a programmed computer 96 and a frequency locked loop (FLL) 98.

In that simulcasting over IP network example, real time data (TDM data) is transported over UDP/IP using RTP (Real Time Protocol), a well known protocol. At the receiver at transmitter 80, a jitter buffer 53 is used to reorder out of sequence packets and "play out" the TDM data, as is known in the crt.

In accordance with the invention (and in contrast to the minor art), delay in the jitter buffer is precisely controlled. In short, frequency locked loop (FLL) 98 times (clocks) the depletion of the data in the jitter buffer 53. When the delay in the jitter buffer is static (constant), the depletion datarate is equal to the incoming datarate. When it is required to increase delay, the depletion datarate is reduced from nominal. When it is required to decrease delay the depletion datarate is increased. The increase/decrease amount is precisely controlled by the computer 96 and FLL 98. The FLL 98 provides a programmable precision frequency offset from nominal. The computer 96 sets an offset in the FLL 98 for a set amount of time. The amount of that time x offset equals the delay change.

In operation, IP network delay, jitter buffer delay and local (transmitter 80) processing delay are measured and provided to computer 96. The computer 96 determines a value for the jitter buffer delay so that the overall delay equals a high precision, desired target delay (for example, customer specified):

Target Delay=Network Delay+Jitter Buffer Delay+
   Processing Delay

Delay Error=Target Delay−(Network Delay+
   Jitter Buffer Delay+Processing Delay)\

The Processing Delay is defined as the internal delay in converting IP packets into constant bit rate TDM data. Typically, the Processing Delay is minimal, 1 or 2 TDM frames (125 to 250 uS). The measured delay is thus the sum of IP network delay, jitter buffer delay and processing delay.

In one form of the invention, the Target Delay is specified as a 24-bit value with 100 nS units and the Delay Error is in the form of a 24-bit value with 100 nS units.

Given the Target Delay and Delay Error, the computer 96 computes the desired Jitter Buffer Delay is computed by the computer 96, which computes a target jitter buffer delay. The target jitter buffer delay is reached by altering the system timing (TDM bus timing) for a period of time. For example, if the desired jitter buffer delay is 1 mS greater than the existing jitter buffer delay, the computer 96 decreases the TDM clock by 102 Hz or 50 PPM for 20 seconds to achieve the target jitter buffer delay.

Jitter Buffer Delay Change (Sec)=Time(Sec)×
   Frequency Offset in Hz/2.048 MHz.

By altering the TDM bus timing to effect delay changes, delay changes are hitless. The jitter buffer delay change is determined using digital feedback loop control. The computer 96 keys off delay measurement information and used the jitter buffer delay to null any delay error. With this configuration at the studio site, no unique support is required, and the system behaves as converted channel module.

The present invention provides several advantages over prior art systems that utilize a pulse train to compare time delay measurements. For example, with a timing packet, the rate at which time comparisons can be made is limited only by the bandwidth of the network link over which timing packets are being sent. For instance, with a 64 Kbit/s bandwidth for transmission of timing packets; and a timing packet size of 8 bytes, 1000 packets-per-second can be sent. This means that 1000 delay measurements per second can be made. In addition, the time reference point of the timing packets could be increased, for instance, from one second to one minute. Thereby allowing 1000 delay measurements per second within a window size that spans 1 minute. For example, delays of up to a minute can be measured. This is a useful feature in networks that have high delay characteristics such as IP networks and satellites.

More frequent timing measurements essentially make the system more responsive. For example, changes in the network link delay from source site to transmitter sites can be adjusted faster than with conventional systems. A higher level of responsiveness is particularly useful in microwave based T1/E1 links, which have "wander" associated with atmospheric conditions. This wander is a low frequency delay change. The responsive timing packet based approach can accommodate, or null this wander while the pulse train approach may not.

Also, the timing packet is a form of data transmission that is more amenable to interfacing with a computer than is a pulse train. Since the system of the invention may be considered to be a feedback loop, by utilizing a computer to make feedback compensation calculations, Digital Signal Processing (DSP) techniques can be applied to correct for changes in the network delay. Well known techniques for optimizing the feedback loop response can be implemented in a DSP algorithm.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. The invention may be embodied in other specific forms without departing from the spirit or essential characteristics thereof. It is intended that the scope of the invention be limited only by the claims appended hereto.

What is claimed is:

1. A simulcast transmission system comprising: a source site including:
- a source generator configured to generate a timing packet, the timing packet containing a GPS timestamp generated at the source site;
- a source transmitter configured to transmit the timing packet and a content signal over a packet switched network to at least two transmitter sites;
- a plurality of transmitter sites configured to be coupled over the packet switched network to the source site, each transmitter site including:
- a receiver for receiving the timing packet and content signal from the packet switched network;
- a comparator configured to compare the GPS timestamp contained in the received timing packet to a GPS timestamp generated at a GPS receiver at the transmitter site to determine a differential $\Delta T$ representative of the difference between said timestamps;
- a delay processor, comprising a jitter buffer configured to receive said packets, that is responsive to an applied clock signal to provide an adjustable delay to said packets responsive to the comparator and configured to delay the received content signal by an amount related to $\Delta T$, such that the content signals at said plurality of transmitter sites are substantially synchronized;
- wherein said delay processor includes a frequency locked loop for generating said clock signal,
- wherein said delay processor is responsive IP network delay determined from said comparison so that said clock signal;
  - (i) when the determined network delay is static, is configured to drive said jitter buffer to clock said packets at the same rate said packets are received at said jitter buffer,
  - (ii) when the determined network delay is increasing, is configured to drive said jitter buffer to clock said packets at a rate reduced with respect to the rate said packets are received at said jitter buffer, and
  - (ii) when the determined network delay is decreasing, is configured to drive said jitter buffer to clock said packets at a rate increased with respect to the rate said packets are received at said jitter buffer.

2. A system according to claim 1, wherein each transmitter site further includes a transmitter coupled to the delay processor, the transmitter continuously transmitting the delayed received content signal.

3. A system according to claim 1, wherein the source site further includes a GPS receiver for generating the GPS timestamp associated with the source site.

4. A system according to claim 1, wherein the timing packet is a UDP packet that is adapted for transmission on a packet switched network.

5. A system according to claim 1, wherein each transmitter site is coupled to the source site by a T1/E1 connection.

6. A system according to claim 1, wherein each transmitter site further includes a GPS receiver for generating the GPS timestamp associated with the transmitter site.

7. A method for synchronizing signal transmission in a simulcast system, the method comprising:
- a) generating a timing packet at a source site, the timing packet containing a GPS timestamp associated with the source site wherein the GPS timestamp is obtained from a GPS receiver located at the source site;
- b) transmitting the timing packet and a content signal over a link to a plurality of transmitter sites;
- c) delaying transmission of the received content signal by an adjustable amount of delay at the transmitter site, wherein delaying transmission of the received content signal, comprises:
  - receiving said IP packets at a jitter buffer, and in response to an applied clock signal, adjustably delaying said packets according to an IP network delay determined from said comparing step, such that
    - (i) when the determined network delay is static, drives said jitter buffer to clock said packets at the same rate said packets are received at said jitter buffer,
    - (ii) when the determined network delay is increasing, drives said jitter buffer to clock said packets at a rate reduced with respect to the rate said packets are received at said jitter buffer, and
    - (iii) when the determined network delay is decreasing, drives said jitter buffer to clock said packets at a rate increased with respect to the rate said packets are received at said jitter buffer;
- d) at each transmitter site, comparing the GPS timestamp in the received timing packet to a GPS timestamp associated with the transmitter site to determine a differential $\Delta T$ representative of the difference between said timestamps; and
- e) at each transmitter site and in response to the comparison delaying the received content signal by an amount related to $\Delta T$;
- whereby the content signals at the plurality of transmitter sites are substantially synchronized.

8. A method according to claim 7, further comprising the step of continuously repeating steps a) through e) during transmission by the simulcast system.

9. A method according to claim 7, wherein the step of generating includes encoding the GPS timestamp in the timing packet.

10. A method according to claim 7, wherein the step of transmitting includes transmitting the timing packet to the receiver at the transmitter site on a single timeslot in a T1/E1 connection.

11. A method according to claim 7, wherein the step of transmitting includes transmitting the timing packet and content signal to the transmitter sites in IP packets over a packet switched network.

12. A method according to claim 7, wherein said delaying step uses a frequency locked loop for generating said clock signal.

13. A method according to claim 7, wherein the step of comparing includes obtaining the GPS timestamp from a GPS receiver located at the transmitter site.

14. A simulcast transmitter site comprising:
- a receiver for receiving a timing packet and a content signal from an Internet protocol (IP) link, the timing packet containing a GPS timestamp, wherein the timing packet and the GPS timestamp are generated at a source site;
- a comparator for comparing the GPS timestamp in the received timing packet to a GPS timestamp associated with the transmitter site to determine a differential $\Delta T$ representative of the difference between the compared timestamps; and
- a delay processor, comprising a jitter buffer configured to receive said timing packets, that is responsive to an applied clock signal to provide an adjustable delay to said packets responsive to the comparator and configured to delay the received content signal by an amount related to $\Delta T$, such that the content signals at said plurality of transmitter sites are substantially synchronized;

wherein said delay processor includes a frequency locked loop for generating said clock signal, wherein said delay processor is responsive IP network delay determined from said comparison so that said clock signal;

(i) when the determined network delay is static, is configured to drive said jitter buffer to clock said packets at the same rate said packets are received at said jitter buffer, (ii) when the determined network delay is increasing, is configured to drive said jitter buffer to clock said packets at a rate reduced with respect to the rate said packets are received at said jitter buffer, and (iii) when the determined network delay is decreasing, is configured to drive said jitter buffer to clock said packets at a rate increased with respect to the rate said packets are received at said jitter buffer.

15. A system according to claim 14, wherein the transmitter site further includes a transmitter coupled to the delay processor, the transmitter continuously transmitting the delayed received content signal.

16. A system according to claim 14, wherein the transmitter site further includes a GPS receiver configured to obtain the GPS timestamp at the transmitter site.

* * * * *